(12) United States Patent
Miller

(10) Patent No.: US 8,419,077 B2
(45) Date of Patent: Apr. 16, 2013

(54) SELF ALIGNING COUPLING

(75) Inventor: Kyle Geary Miller, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 473 days.

(21) Appl. No.: 12/547,786

(22) Filed: Aug. 26, 2009

(65) Prior Publication Data
US 2011/0049871 A1 Mar. 3, 2011

(51) Int. Cl.
*F16L 19/02* (2006.01)
(52) U.S. Cl.
USPC ........................................ 285/325; 24/16 PB
(58) Field of Classification Search ............ 285/67, 285/260, 325, 921, 305; 24/16 PB, 21, 22, 24/23 B
See application file for complete search history.

(56) References Cited

U.S. PATENT DOCUMENTS

| | | | | |
|---|---|---|---|---|
| 68,650 | A | * | 9/1867 | Perkins et al. .................. 285/67 |
| 256,060 | A | * | 4/1882 | Seagrave et al. .............. 138/157 |
| 714,311 | A | * | 11/1902 | Lee .................................. 285/67 |
| 1,739,131 | A | * | 12/1929 | Van Ness Eick ................ 285/67 |
| 2,171,288 | A | * | 8/1939 | Dearborn ........................ 285/67 |
| 2,950,130 | A | * | 8/1960 | Schneider ....................... 285/67 |
| 3,260,539 | A | * | 7/1966 | Herron ........................... 285/24 |
| 3,744,825 | A | | 7/1973 | Cooper et al. |
| 4,008,937 | A | | 2/1977 | Filippi |
| 4,325,417 | A | * | 4/1982 | Boggs et al. .................... 141/98 |
| 4,340,097 | A | * | 7/1982 | Ammann et al. ............... 141/98 |
| 5,335,945 | A | | 8/1994 | Meyers |
| 5,383,691 | A | * | 1/1995 | Anthony ....................... 285/325 |
| 6,120,064 | A | * | 9/2000 | McNamara ..................... 285/38 |
| 6,296,284 | B1 | * | 10/2001 | Weischedel .................. 285/325 |
| 6,354,003 | B1 | | 3/2002 | Lehmann et al. |
| 7,240,930 | B2 | | 7/2007 | Stravitz |
| 7,464,971 | B2 | * | 12/2008 | Bennett ......................... 285/373 |
| 7,488,007 | B2 | * | 2/2009 | Weber ........................... 285/325 |

* cited by examiner

*Primary Examiner* — Aaron Dunwoody
(74) *Attorney, Agent, or Firm* — Gifford, Krass, Sprinkle, Anderson & Citkowski, P.C.

(57) ABSTRACT

A self aligning coupling system for aligning one end of tubing to another end of tubing is disclosed. The self aligning coupling system can include a first coupling member which is engageable with a second coupling member, each coupling member being generally cylindrical and having a flange projecting axially from a first segment of a circumference thereof and a flange-free portion defined by a remainder of the circumference. The first and second coupling members are configured so that when the first coupling member is engaged with the second coupling member, the flange of the first coupling member contacts the flange-free portion of the second coupling member and the flange of the second coupling member contacts the flange-free portion of the first coupling member.

12 Claims, 3 Drawing Sheets

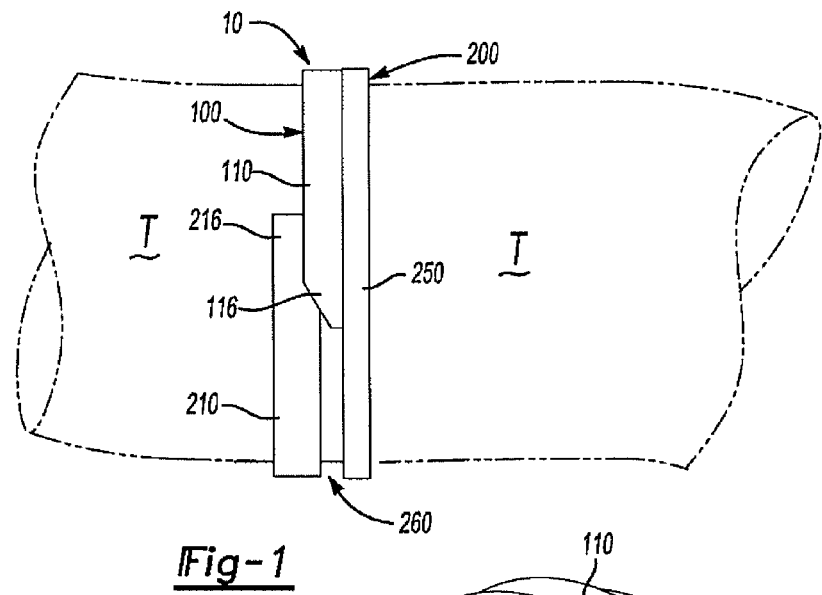
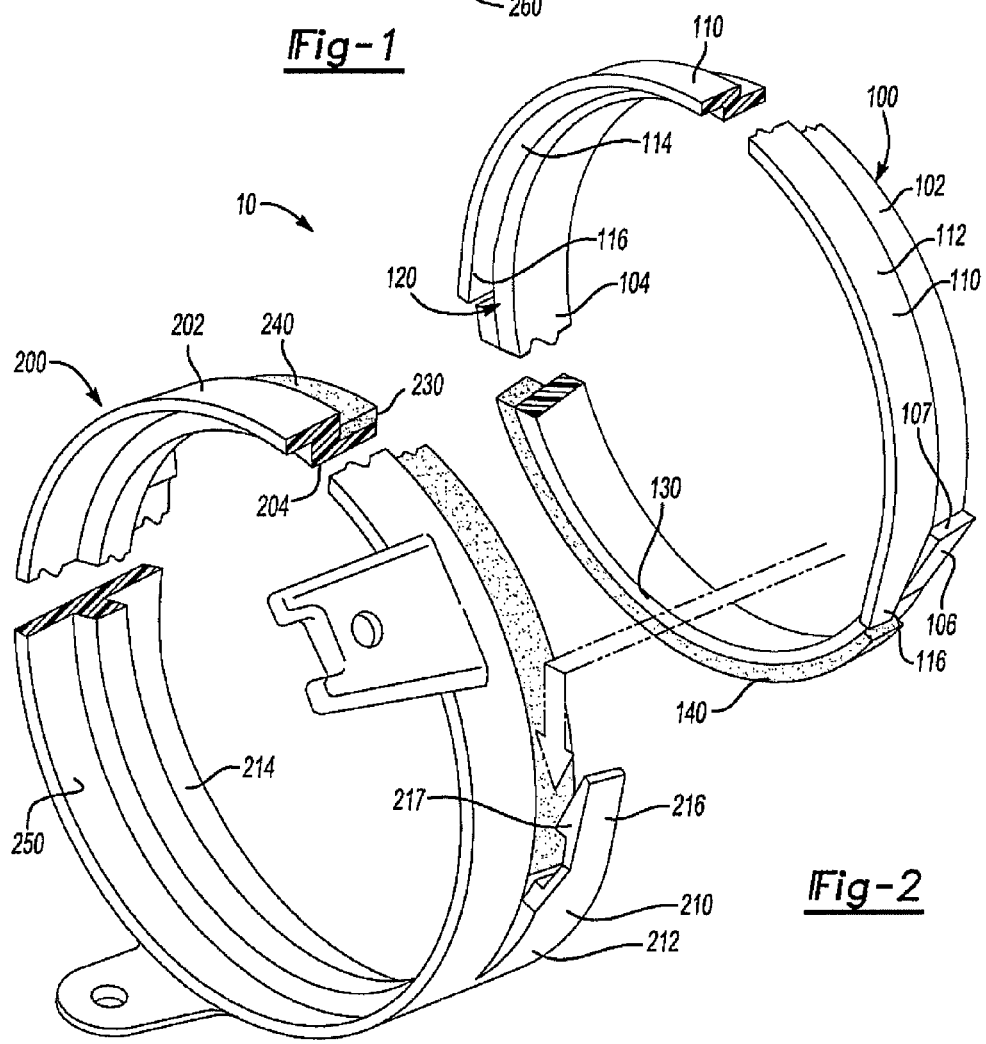

SELF ALIGNING COUPLING

FIELD OF THE INVENTION

The present invention relates to a coupling system for aligning one end of tubing to another end of tubing. In particular, the present invention relates to a self aligning coupling system.

BACKGROUND OF THE INVENTION

The passing of a fluid through tubing, piping, conduits, etc. can require a connector or coupling system for joining two pieces of tubing together. For example, when passing air through plastic tubing, it is not uncommon for one piece of tubing to be connected to another piece of tubing. In some instances, a sleeve can be inserted within opposing ends of the tubing pieces and an outer clamp used to attach the opposing ends to the inner sleeve. In other instances, the tubing can be manufactured such that it has an attachment mechanism, for example threads, as part of its ends and thereby afford for attachment of two pieces of tubing by screwing the pieces together. It is appreciated that adhesives, welding and the like can also be used to join tubing pieces together.

However, in some environments, such as within confined spaces, a coupling system that requires the turning of the tubing or any type of cumbersome manipulation of the tubing, inner sleeve, clamps, etc. can be problematic with respect to installation of the tubing in a structure. As such, a self aligning coupling system that is easy to use, and requires relatively little manipulation of any coupling components would be desirable.

SUMMARY OF THE INVENTION

A self aligning coupling system for aligning and attaching one end of tubing to another end of tubing is disclosed. The self aligning coupling system can include a first coupling member which is engageable with a second coupling member, each coupling member being generally cylindrical. Each coupling member also has a flange projecting axially from a circumference of a first segment and a flange-free portion defined by a remainder of the circumference of the first segment.

The first and second coupling members are configured so that when the first coupling member is engaged with the second coupling member, the flange of the first coupling member contacts the flange-free portion of the second coupling member and the flange of the second coupling member contacts the flange-free portion of the first coupling member.

The first coupling member can have a first locking detent and the second coupling member can have a second locking detent. The first and second locking detents can be lockably engageable in order to retain the first and second coupling members in engagement with each other. In some instances, the first locking detent is in the form of a tab extending radially outward from an outer surface of the first coupling member and the second locking detent is in the form of a hook extending from an inner surface of the flange of the second coupling member. The hook is lockably engageable with the tab when the first coupling member is engaged with the second coupling member.

The flange of the first coupling member may or may not at least partially overlap the flange-free portion of the second clamping member when the first coupling member is engaged with the second coupling member. In addition, a strip of foam can be included and be located between the flange of the first coupling member and the flange-free portion of the second coupling member when the two coupling members are engaged with each other. Likewise, the flange of the second coupling member can at least partially overlap the flange-free portion of the first coupling member and a strip of foam may be included therebetween.

In some instances, the flange of the first coupling member can circumferentially extend beyond the flange of the second coupling member when the two coupling members are engaged with each other. In addition, the second coupling member can have an outer circumferential ridge that is spaced apart from the flange of the second coupling member, the outer circumferential ridge and the flange forming a circumferential open channel therebetween. When such an open channel is present, the flange of the first coupling member can have a pair of opposed ends, with each end located at least partially within the circumferential open channel.

The flange of the second coupling member can also have a pair of opposed ends. The pair of opposed ends of the flange of the first coupling member and the pair of opposed ends of the flange of the second coupling member can have complementary contoured facing edges such that each pair of opposed ends of the flange of the first coupling member is guided into the circumferential open channel of the second coupling member when the two members are engaging each other. In some instances, the complementary contoured facing edges of the opposed ends of the flange of the second coupling member form a generally V-shaped opening of the circumferential open channel. In addition, the complementary contoured facing edges of the opposed ends of the flange of the first coupling member each form a generally inverted V-shaped end. In this manner, the generally inverted V-shaped end of the flange of the first coupling member is guided into the circumferential open channel of the second coupling member by the generally V-shaped opening provided by the ends of the flange thereof.

BRIEF DESCRIPTION OF THE DRAWINGS

FIG. 1 is a side view of an embodiment for the present invention;

FIG. 2 is an exploded perspective view of an embodiment of the present invention;

DETAILED DESCRIPTION OF THE PRESENT INVENTION

Figures 3, 4:
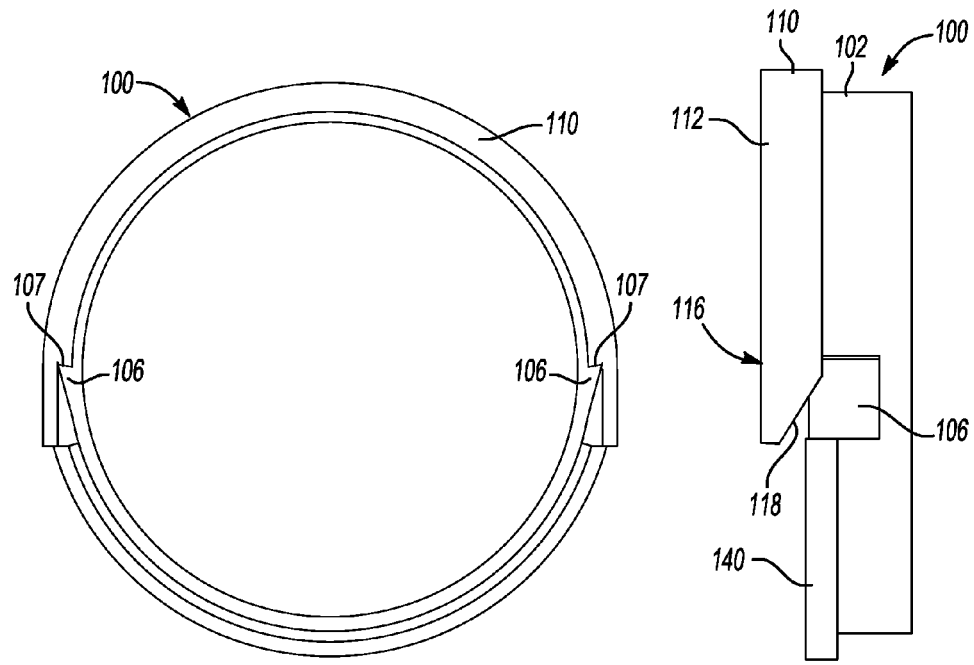
FIG. 3 is an end view of a first coupling member according to an embodiment of the present invention.
FIG. 4 is a side view of the first coupling member shown in FIG. 3.

The present invention discloses a self aligning coupling system for aligning and attaching one end of tubing to another end of tubing. As such, the present invention has utility as a component in a plant, machine, motor vehicle and the like.

The self aligning coupling system can include a first coupling member which is engageable with a second coupling member. Each of the coupling members can be generally cylindrical and have a flange projecting axially from a first segment of a circumference thereof and a flange-free portion defined by a remainder of the circumference thereof. The first and second coupling members are configured so that when the first coupling member is engaged with the second coupling member, the flange of the first coupling member contacts the flange-free portion of the second coupling member and/or the flange of the second coupling member contacts the flange-free portion of the first coupling member. The first coupling member can have a first locking detent and the second coupling member can have a second locking detent, the first and second locking detents being lockably engageable and affording for the first and second coupling members to be retained in engagement with each other.

In some instances, the first locking detent is in the form of a tab that extends radially outward from an outer surface of the first coupling member, and the second locking detent is in the form of a hook that extends radially inward from an inner surface of the flange of the second coupling member. The hook can lockably engage with the tab and afford for the first coupling member to be engaged with the second coupling member.

The flange of the first coupling member may or may not at least partially overlap the flange-free portion of the second coupling member and the flange of the second coupling member may or may not at least partially overlap the flange-free portion of the first coupling member. In addition, a strip of foam can be located between a flange and a flange-free portion. The strip of foam can provide an outward projecting force onto the second locking detent and thereby assure engagement between the first and second locking detents.

The flanges of the first and second coupling members can be dimensioned such that each flange extends beyond the flange of the opposed coupling member. In addition, the second coupling member can have an outer circumferential ridge that is spaced apart from its flange and thereby provide a circumferential open channel therebetween. When such a channel is present, a pair of opposed ends of the flange of the first coupling member can be located at least partially within the circumferential open channel when the first and second coupling members are engaged with each other.

In order to assist and provide a self alignment of the two coupling members, a pair of opposed ends of the flange of the second coupling member and the pair of opposed ends of the flange of the first coupling member can have complementary contoured facing edges. The complimentary contoured facing edges can afford for the opposed ends of the flange of the first coupling member to be guided into the circumferential open channel of the second coupling member. In some instances, the complementary contoured facing edges of the opposed ends of the flange of the second coupling member can each afford a generally V-shaped opening for the circumferential open channel. In addition, the complementary contoured facing edges of the opposed ends of the flange of the first coupling member can each form a generally inverted V-shaped end, the generally inverted V-shaped end being guided into the circumferential open channel by the generally V-shaped opening. When the opposed ends of the flange of the first coupling member are guided into and located at least partially within the circumferential open channel of the second coupling member, the first locking detent can engage the second locking detent.

Turning now to FIGS. 1 and 2, an embodiment of a self aligning coupling system is shown generally at reference numeral 10. In particular, FIG. 1 illustrates a side view of the self aligning coupling system 10 in an engaged configuration with a piece of tubing T extending from a first coupling member 100 and a different piece of tubing T extending from a second coupling member 200. It is appreciated that the tubing T can be attached to the first coupling member 100 and/or the second coupling member 200 using any means or method known to those skilled in the art, illustratively including the use of adhesives, welding, molding of the tubing directly to one of the coupling members, the use of threaded fasteners and the like.

As shown in FIG. 2, the first coupling member 100 can have an outer surface 102 and an inner surface 104. In addition, a flange 110 can extend axially from a circumference 120 and may be present only partially along the circumference 120 of the first coupling member 100 and thereby provide for a flange-free portion 130. The flange 110 can also have an outer surface 112 and an inner surface 114.

A piece of foam 140 can be located radially to the first coupling member 100 and may or may not be attached to the outer surface 102. In some instances, the piece of foam 140 can extend from the flange-free portion 130 and may or may not overlap said portion. It is appreciated that for the purposes of the present invention, the term "foam" can include any compressible or "rubbery" material known to those skilled in the art, illustratively including natural rubber, cork, elastomers, polyurethane foam, extruded polystyrene foam, combinations thereof and the like.

Located adjacent to the flange 110 can be a first locking detent 106. In some instances, the first locking detent 106 can extend radially outward from the outer surface of the first coupling member 100. In other instances, the first locking detent 106 can be in the form of tab that has a step surface 107 that extends radially outward from the outer surface 102.

The second coupling member 200 can have an outer surface 202 and an inner surface 204. Similar to the first coupling member 100, a flange 210 can extend axially from the second coupling member 200, the flange 210 having an outer surface 212 and an inner surface 214. Also included can be a hook 217 that extends radially inward from an inner surface 214 of the flange 210 and an optional strip of foam 240 can be located adjacent to the second coupling member 200.

Both of the flanges 110 and 210 can have opposed ends. In particular, the flange 110 can have a pair of opposed ends 116 and the flange 210 can have a pair of opposed ends 216. As shown in FIG. 1, the end 116 of the first coupling member 100 can extend circumferentially beyond the end 216 of the second coupling member 200. Stated differently, the flange 110 of the first coupling member 100 extends circumferentially beyond the flange 210 of the second coupling member 200. In some instances, the second coupling member 200 can have an outer circumferential ridge 250 that is spaced apart from the flange 210. In this manner, a circumferential open channel 260 is present therebetween.

Turning now to FIGS. 3 and 4, an end view and a side view, respectively, for the first coupling member 100 is shown. As illustrated in these figures, the flange 110 extends axially from the first coupling member 100 and the step surface 107 of the tab 106 extends radially outward from the outer surface 102. In addition, at least one of the ends 116 of the flange 110 can be generally V-shaped. This V-shaped end can provide a contoured facing edge 118 that can assist in the guiding of the flange 110 into a desired position when the first coupling member 100 is engaged with the second coupling member 200. FIG. 4 also illustrates that the strip of foam 140 can overlap the flange-free portion 130 of the first coupling member 100.

Figures 5, 6:
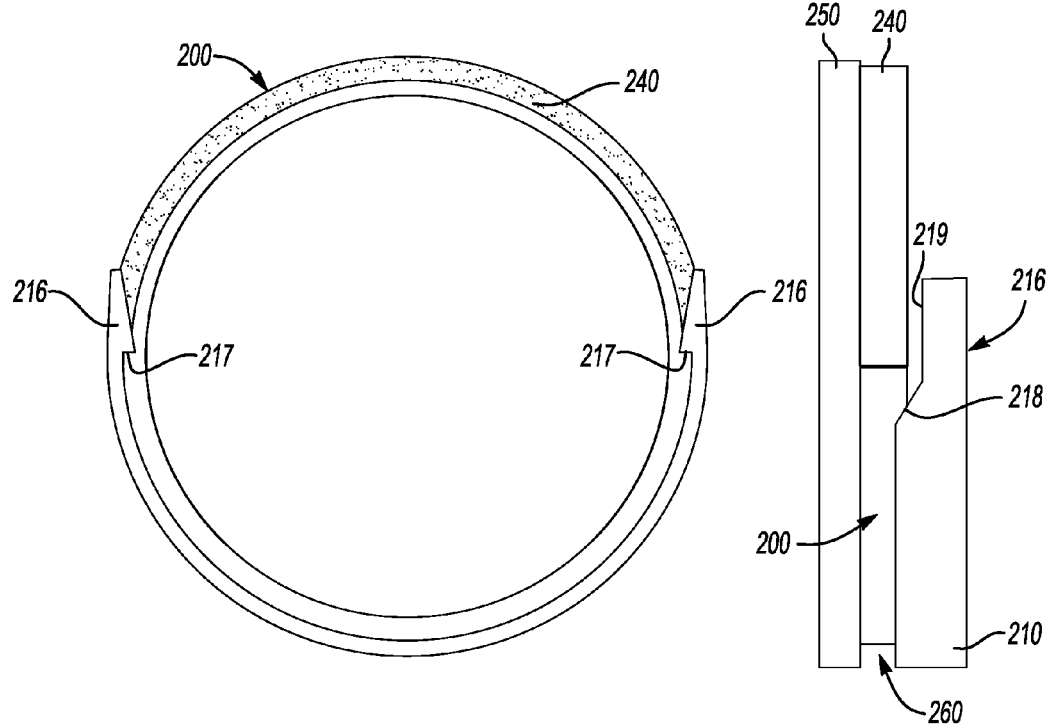
FIG. 5 is an end view of a second coupling member according to an embodiment of the present invention.
FIG. 6 is a side view of the second coupling member shown in FIG. 5.

Looking specifically at FIGS. 5 and 6, an end view and a side view, respectively, of the second coupling member 200 is shown. As stated above, the flange 210 can be spaced apart from the outer circumferential ridge 250 and thereby provide for the circumferential open channel 260. In addition, the end 216 of the channel 210 can have a contoured facing edge 218 that provides a generally V-shaped opening into the circumferential open channel 260. The facing edge 218 in combination with a circumferential end surface 219 affords for the end 116 and facing edge 118 of the flange 110 to be guided at least partially within the circumferential open channel 260. It is appreciated that bringing the first coupling member 100 into proximity to the second coupling member 200, or vice versa, and allowing for the complementary facing edges 118 and 218 to come into contact with each other results in self aligning of the two coupling member pieces with each other and thus any tubing ends that are attached to the members.

FIG. 5 also illustrates that the flange 210 can have a second locking detent 217 that extends radially inward from the inner surface 214 of the flange 210. In some instances, the second locking detent 217 can be in the form of hook that is part of and/or located proximate to the end 216 of the flange 210.

Figure 7:
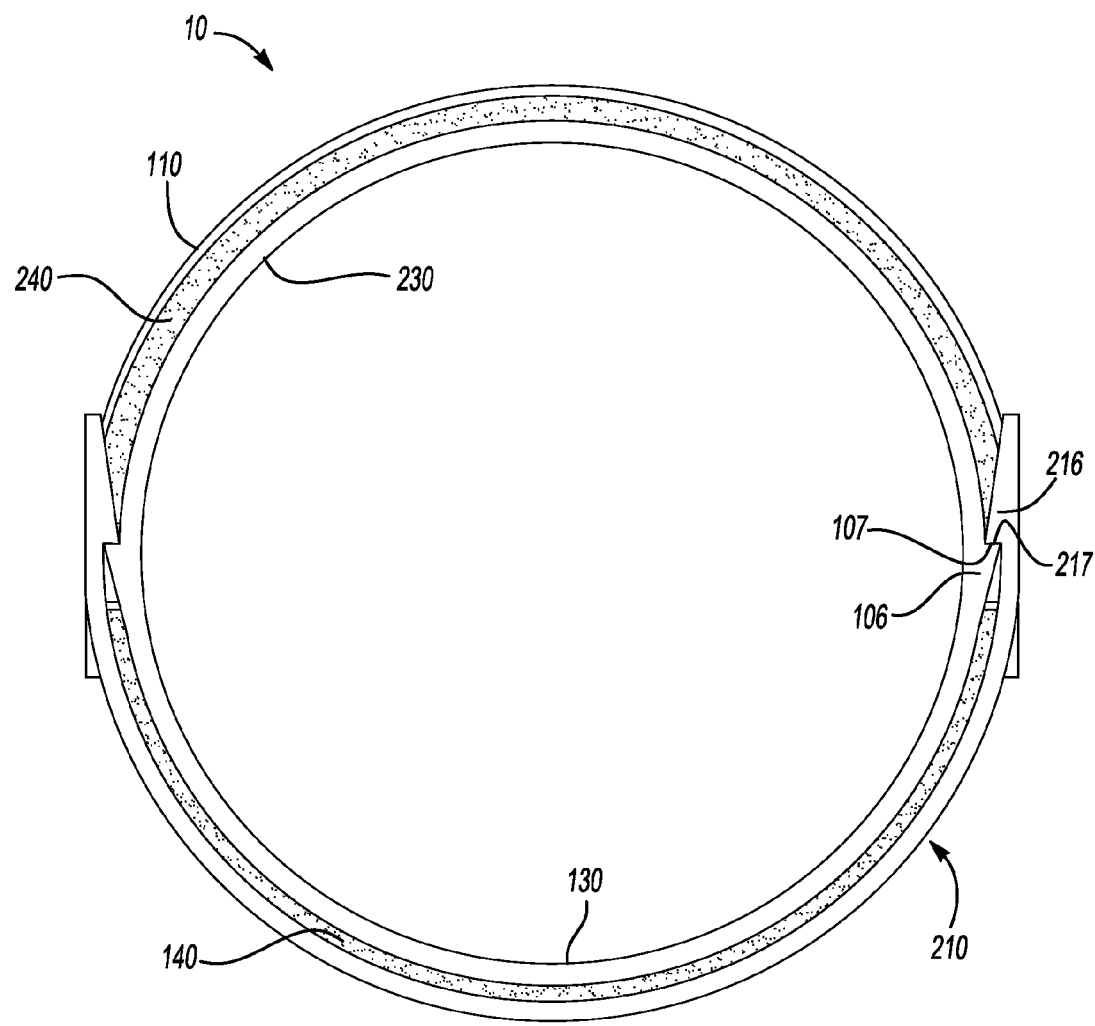
FIG. 7 is an end view of the first coupling member lockably engaged with the second coupling member according to an embodiment of the present invention.

Turning now to FIG. 7, lockable engagement of the first coupling member 100 with the second coupling member 200 is shown. As shown in this figure, the second locking detent 217 of the second coupling member 200 engages with the first locking detent 106 of the first coupling member 100. Stated differently, FIG. 7 illustrates that the second locking detent 217 and the first locking detent 106 radially overlap each other. In addition, the foam piece 104 and/or the foam piece 240 provides for an outward projecting force onto the flange 110 and/or the flange 210. As such, it is appreciated that this outward projecting force can provide a constant and/or continuous tension between the first locking detent 106 and the second locking detent 217, the tension affording for continuous lockable engagement between the first coupling member 100 and the second coupling member 200.

In operation, a piece of tubing T is attached to the first coupling member 100 and another piece of tubing T is attached to the second coupling member 200. The first coupling member 100 and the second coupling member 200 are brought into proximity with each other and the flange 110 is placed at least partially between the flange 210 and the outer circumferential ridge 250. The flange 110 is moved towards the circumferential open channel 260, or vice versa, and the contoured facing edge 118 comes into contact with the edge 219 and/or the contoured facing edge 218 and the flange 210 is guided into the circumferential open channel 260. As the end 116 of the flange 110 is guided into the channel 260, the end 216 of the flange 210 comes into contact with the first locking detent 106. In addition, the second locking detent 217 extending radially inward from the inner surface 214 of the end 216 engages the first locking detent 106 extending radially outward from the outer surface 102 of the first coupling member 100. It is appreciated that the first locking detent 106 and the second locking detent 217 can have inclined surfaces such that once the two locking detents are engaged with each other a generally outward force must be applied to the end 216 in order to unlock the two coupling elements from each other. In addition, if the strip of foam 140 and/or the strip of foam 240 are present, additional tension is placed upon the interlocking first locking detent 106 and second locking detent 217 such that vibrations, minor impacts and the like do not result in the decoupling of the first coupling member 100 from the second coupling member 200.

The first coupling member 100 and the second coupling member 200 can be made from any material known to those skilled in the art that provides sufficient properties for coupling one piece of tubing to another piece of tubing, illustratively including plastics, metals, alloys, wood, combinations thereof and the like. In addition, it is appreciated that various modifications can be readily made to the embodiments described herein without departing from the scope and spirit thereof. Accordingly, it is the scope of the claims that limit the invention and not the teachings provided by the specific illustrated embodiment.

I claim:

1. A self aligning coupling system for aligning one end of tubing to another end of tubing, said coupling system comprising:
    a cylindrical first coupling member having an outer surface and a first circumference;
    a first flange extending axially along a portion of and from said first circumference such that said first circumference has a first flange portion and a first flange-free portion;
    a first locking detent extending radially outward from said outer surface of said first coupling member;
    a cylindrical second coupling member having a second circumference;
    a second flange having an inner surface and extending axially along a portion of and from said second circumference such that said second circumference has a second flange portion and a second flange-free portion;
    a second locking detent extending radially inward from said inner surface of said second flange;
    said first locking detent and said second locking detent radially overlapping each other and lockably engaging said first coupling member to said second coupling member when said first flange contacts said second flange-free portion of said second circumference and said second flange contacts said first flange-free portion of said first circumference and is located radially outward from and overlaps said first locking detent of said first coupling member.

2. The coupling system of claim 1, wherein said first flange at least partially overlaps said second flange-free portion of said second circumference when said first coupling member is lockably engaged with said second coupling member.

3. The coupling system of claim 2, further comprising a strip of foam located between said first flange and said second flange-free portion of said second circumference when said first coupling member is lockably engaged with said second coupling member.

4. The coupling system of claim 1, wherein said second flange at least partially overlaps said first flange-free portion of said first circumference when said first coupling member is lockably engaged with said second coupling member.

5. The coupling system of claim 4, further comprising a strip of foam located between said second flange and said first flange-free portion of said first circumference when said first coupling member is lockably engaged with said second coupling member.

6. The coupling system of claim 1, wherein said first flange radially extends beyond said second flange of said second circumference when said first coupling member is lockably engaged with said second coupling member.

7. The coupling system of claim 1, further comprising an outer circumferential ridge extending from said second coupling member and spaced apart from said second flange, said outer circumferential ridge and said second flange forming a circumferential open channel therebetween.

8. The coupling system of claim 7, wherein said first flange has a pair of opposed ends, each of said pair of opposed ends located at least partially within said circumferential open channel between said outer circumferential ridge and said second flange when said first coupling member is lockably engaged with said second coupling member.

9. The coupling system of claim 8, wherein said second flange has a pair of opposed ends, said pair of opposed ends of said second flange and said pair of opposed ends of said first flange having complimentary contoured facing edges such that each of said pair of opposed ends of said first flange is guided into said circumferential open channel when said first coupling member is being lockably engaged with said second coupling member.

10. The coupling system of claim 9, wherein said complimentary contoured facing edges of said opposed ends of said second flange each form a generally V-shaped opening into said circumferential open channel.

11. The coupling system of claim 10, wherein said complimentary contoured facing edges of said opposed ends of said first flange each have a generally V-shaped end that fits within said generally V-shaped opening into said circumferential open channel.

12. The coupling system of claim 9, wherein said first locking detent engages said second locking detent when said opposed ends of said first flange is guided into and located at least partially within said circumferential open channel located between said outer circumferential ridge and said second flange.

\* \* \* \* \*